Patented Mar. 8, 1949

2,463,733

UNITED STATES PATENT OFFICE 2,463,733

WELL LOGGING

Frederic W. Albaugh, Los Angeles, Calif., assignor to Union Oil Company of California, Los Angeles, Calif., a corporation of California No Drawing. Application June 17, 1946, Serial No. 677,417

14 Claims. (Cl. 250—83)

The invention relates to a method of characterizing the strata traversed by a well bore and more particularly to a method of distinguishing between oil sands and water sands encountered in the formations transgressed.

The importance and desirability of being able to ascertain the existence and location of oil and water sands in relationship to other strata in a well bore is so elementary as to preclude discussion thereof. Of correlative and equal importance would be a method of distinguishing between these oil and water sands once the location of a sand structure is ascertained.

Many methods have been developed for acquiring at least a partial picture of the properties of the strata through which a well has been drilled. Formation data as thus obtained are valuable aids to the location of the oil zones in exploratory drilling, to the location of by-passed oil zones behind previously set casings, and to the development of geological correlations relative to comparatively large areas. Such methods include electric well logging, gamma-ray logging, and neutron logging.

Electric logging, the most commonly used method, consists in the measurement of two qualities, formation resistivity and self-potential. Determination of the former involves measurement of the difference of potential induced between two electrodes located in the well bore by the passage of an artificially impressed current between a third electrode, also located in the well bore, and a fourth electrode grounded at or near the surface. The self-potential does not involve an artificially impressed current flow and is measured as the difference of potential between an electrode in the hole and another grounded at or near the surface. In current practice such measurements are made systematically along the entire length of open, or uncased hole. The results plotted as functions of the depth at which individual readings are taken constitute the electric log. By inspection of a log, or of several made in the same hole under specifically modified conditions, shale, non-porous rock, porous sands or limestone and other strata can be located with considerable accuracy and fairly reliable conclusions can be drawn as to the nature of the fluid saturation oil, water, gas or a mixture thereof existing in a porous stratum. Interpretation of electric logs from a member of adjacent wells yields information regarding the general geology of a field such as location of faults, direction of dip of strata, and the like.

However, there are certain limitations inherent in this method which minimize its usefulness in some instances and completely prohibit its use in other instances. Thus, to obtain the best results by the electric logging method it is necessary to employ a water-base drilling fluid but in many formations the inevitable penetration of the formation by drilling mud filtrate has a deleterious effect on the productivity of the completed well. It is believed that this effect is largely avoided by use of an oil-base drilling fluid, however, electric logs made in the presence of oil-base drilling fluid have, to date, been of inferior quality. Also, for obvious reasons, the electric log cannot be used to log an old well through an already installed steel casing.

The gamma-ray log, often referred to as "radioactive well logging," is based upon naturally occurring differences in the radioactivity levels of various types of strata. This radioactivity derives almost exclusively from potassium and from uranium and thorium and their radioactive daughter elements, because of the elements in the earth only potassium, uranium and thorium are radioactive and yet sufficiently stable to persist in appreciable quantities through geologic time. Three principal types of radiation, all of nuclear origin, are associated with radioactive disintegration in the earth: alpha rays, or high energy helium nuclei; negative beta rays, which are equivalent to high energy electrons; and gamma rays, or high energy photons. Alpha, and beta rays are readily absorbed by matter, thus only the gamma rays are able to penetrate material, such as fluid in the hole or casing, which intervenes between the formation and a counting instrument held in the center of the well bore. Therefore, only the intensity of gamma radiation can be measured and this is employed as a criterion of the level of radioactivity in the formation.

Gamma-ray intensities at various levels in a hole are commonly measured by means of an ionization chamber-type of counting instrument, in which a current flow is induced proportional in magnitude to the primary ionization produced in the chamber by incident gamma rays. In order to increase the sensitivity to incident gamma rays the chamber is filled with a heavy inert gas at greater than atmospheric pressure. Although the current deliveries by the ionization chamber are extremely small, instruments have been developed which amplify them to conveniently measurable proportions. The ionization chamber method is, essentially, a measurement of the conductivity of a gas through which ionizing gamma radiation is passing. There are other instruments for measurement of radiation which are based upon a count of the individual incident rays, e. g., the Geiger-Mueller counter. In such instruments the primary ionization produced in a gas-filled chamber by an incident gamma ray initiates a large transitory electrical discharge, the intensity of which is independent of the magnitude of the primary ionization provided the latter is above a certain critical level. These discharges are amplified and counted and the count observed per unit time is proportional to the frequency of gamma-ray incidence.

The gamma-ray log too possesses some inherent disadvantages. Because the radioactive elements above mentioned are constituents of the rock structure rather than of formation fluids, the log is confined in its effectiveness to distinction between minerals containing different amounts of these radioactive elements. Thus the gamma-ray log will distinguish only between rock structures such as between shale and sand, and while it has proved itself a useful tool in this respect there is a great deal of evidence which indicates the absence of any direct relationship between variations of radioactivity and the presence of liquid petroleum.

In the more recently developed neutron logging method and apparatus the formation adjacent to the well bore is bombarded with fast neutrons followed by a simultaneous measurement of the secondary gamma rays returning from the formation. The neutron is not formed by the spontaneous radioactive decay of any elements but can be obtained as a product of a nuclear reaction between energetic alpha particles and certain of the lighter elements such as beryllium or boron. In the neutron logging method radium, an alpha emitter source of less than about 50 curies, and beryllium are combined to furnish a flux of neutrons. As the neutrons penetrate the formation they undergo inelastic collisions and neutron capture reactions with formation nuclei to produce large quantities of gamma radiation. The gamma-ray intensity attributable to these two processes will, in practice, be large compared to the gamma-ray background and gamma radiation formed from other processes. A representative portion of the gamma radiation will pass through the formation, any fluid or casing in the well bore, and into the gamma-ray detector, which is conventionally of a design similar to that employed in gamma-ray logging. The detector is a part of single logging unit, comprising the detector, the neutron source and an intervening lead shield to prevent interference of gamma-rays originating in the neutron source itself. The entire unit is raised or lowered by a cable in synchronization with an automatic depth and gamma-ray intensity recording device at the surface. The presence of liquid and/or casing in the hole reduces the intensity of the gamma radiation detected but does not affect the selectivity of the method with respect to differences in properties of formation strata.

The usefulness of the neutron log is based upon its sensitivity to hydrogen, the gamma ray intensity detected being inversely proportional to the hydrogen content of the formation. Presumably, in the presence of hydrogen, elastic collisions of neutrons with hydrogen, which produce no gamma rays, are favored at the expense of gamma-ray-producing inelastic collisions with heavier nuclei, and neutron capture by hydrogen is favored at the expense of neutron capture by heavier nuclei, the gamma ray emitted in the latter circumstance being more energetic and hence better able to penetrate matter and reach the detector. Because it detects hydrogen the neutron log has often been called a hydrogen log. The neutron log is used to best advantage in conjunction with a natural gamma-ray log, sand formations being located by means of the gamma-ray log and the presence of hydrogen, hence oil or water, in these sands being determined by means of the neutron log.

However, the neutron logging method is subject to an inherent disadvantage in that it merely locates oil or water and does not distinguish between the two. Thus in no case is it possible to determine whether a particular liquid-containing sand or limestone strata, located by means of the gamma ray and neutron logs, contains predominantly oil or predominantly water. The disadvantage of this limitation is particularly apparent if it is desired to survey a cased well for the location of by-passed oil zones.

It is an object of the present invention to provide an improved method for the logging of oil well bores.

It is a more particular object to provide a well logging method wherein sand structure may be located and the presence of oil or water may be definitely determined. Correlative to this object it is an object of the invention to determine the location of objectionable water sands in a well bore.

It is a further object of my invention to make determinations of the above character through the casing of oil wells presently in existence.

It is a further object of the invention to provide a method for logging a well bore to determine the presence of oil sands and water sands which is not affected by the type of drilling fluid being used in the drilling operation, and is thus equally applicable to usage in conjunction with water base or oil base drilling fluids.

Other objects and advantages of the invention will occur to those skilled in the art as the description thereof proceeds.

The above contemplated objects are accomplished according to the method of my invention by utilizing the gamma-ray log and the neutron log as above described in conjunction with what might be termed a "radioactive chlorine log" hereinafter more fully described. Thus, the well logging method according to my invention comprises an initial gamma-ray log to distinguish shale and sand followed by a neutron log to determine the presence of oil or water within the sands located by the preceding gamma-ray log and followed by a radioactive chlorine log as herein set forth to distinguish between oil and water as located indiscriminately by the preceding neutron log.

To outline the procedure of the radioactive chlorine log briefly, the sands, located by the neutron log, are bombarded for a moderate period of time with an intense flux of neutrons. On cessation of the bombardment, the very high gamma-ray flux prevailing during the bombardment will instantly fall to comparatively low level and thereafter decrease with time. It is the latter radiation which is measured in the chlorine log procedure. This radiation will comprise that due to the natural gamma-ray background and that deriving from the radioactive decay of certain radioactive isotopes synthesized in the formation by neutron capture reactions during the period of neutron bombardment. After the bombardment has been completed and the neutron source removed the gamma-ray intensity in the well-bore adjacent to the bombarded zone is measured at intervals over a number of hours, using a gamma-ray detector or counting device which may be similar or identical to those above described. On the basis of the principles of radioactive decay and assuming absence of chlorine in the rock and pre-knowledge of the approximate per cent of chlorine in the formation water, comparatively simple calculations, as hereinafter set forth allow determination of the per cent of water present in the formation, whereby distinction is readily made between water sands and oil sands.

The neutron flux, which should be of the order of $5 \times 10^8$ to $5 \times 10^{10}$ neutrons per second, is emitted as a product of efficient alpha-neutron reaction occurring in a powdered mixture of an alpha emitter and beryllium, boron, or the like. The reactants may be present in elemental form or as compounds. The reaction may be represented as follows:

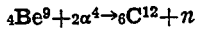

In order to create a neutron flux of the strength cited above it is estimated that an alpha-ray source of 50 to 5000 curies or preferably about 100 to 1000 curies will be required. One gram of radium in equilibrium with its daughter elements amounts to only four curies of alpha particles, hence, it is immediately apparent that the use of radium is out of the question, except in rare cases when the lower specified limit of neutron intensity would suffice. However, in recent years alpha-emitters of considerably greater activity per unit weight than radium have been discovered and prepared and it is contemplated to employ such alpha-emitters in the present invention. Thus polonium$^{210}$, i. e., polonium having an atomic weight of 210, in decomposing to stable lead$^{206}$ will emit an alpha particle. Considering the half-life of polonium$^{210}$ which is 136 days and the half-life of radium which is 1690 years, it is evident that only 0.022 gram of polonium$^{210}$ is required for an alpha particle source of 100 curies strength, as compared to 25 grams of radium for the same rate of alpha particle emission. Similarly, plutonium$^{238}$ in an amount of about 3 grams would constitute a 100 curie alpha particle source.

The isotope polonium$^{210}$ may be prepared by neutron irradiation of bismuth$^{209}$ which undergoes a neutron-gamma reaction to yield bismuth$^{210}$, the latter decaying to polonium$^{210}$ by beta particle emission. The preparation and disintegration of polonium$^{210}$ may be briefly summarized as follows:

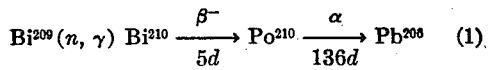

Similarly plutonium$^{238}$ may be prepared in the following manner:

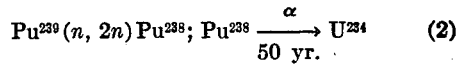

The energies of the fast neutrons emitted by the neutron source will be distributed over an energy spectrum with a maximum of about $10^7$ electron-volts. As these neutrons penetrate the formation their speeds and energies are progressively reduced by elastic and inelastic collisions with formation nuclei with the result that at any given instant neutrons ranging in energy from thermal energy to the maximum energy of the incident spectrum will be present. At all of these energies neutrons will be subject to capture by formation nuclei, but the probability of capture will vary markedly with the neutron energy and with different isotopic components of the formation. In general the capture probabilities will be greatest for thermal energy, or slow, neutrons. The mechanism of neutron capture is the neutron-gamma reaction, in which a target isotope and a neutron react to form a synthetic isotope, or product nucleus, having the same atomic number as the target nucleus but a mass number one unit higher. Due to the exothermic nature of this reaction, a hard gamma ray is instantaneously emitted. The synthetic isotopes formed fall into three principal classes: those which are not radioactive, and for purposes of this invention are, thus, of no interest; those which are radioactive but may be disregarded because they disintegrate with emission of beta particles only, which because of their ready absorption in matter cannot penetrate the formation, hole fluids and counter walls and cannot therefore be registered in the counting chamber; and finally, those which disintegrate with emission of gamma rays, and thus are susceptible to observation. It is with the gamma radiation derived from the decay of these synthetic isotopes, hereinafter called the residual gamma radiation, that the chlorine log is concerned.

Synthesis of radioactive isotopes in the formation by reactions other than the neutron-gamma reaction will occur during the bombardment. For instance, considerable amounts of sulfur$^{35}$ and carbon$^{14}$ will be formed by neutron-proton reactions involving slow neutrons, but since neither isotope is a gamma-ray emitter they may be disregarded. Other reactions of the neutron-proton or neutron-alpha type could occur with fast neutrons, however, if the chlorine log is run with liquid in the hole, said liquid will slow down the neutrons before they reach the formation and such reactions will be suppressed. Also, if the log is run in a dry hole and contrary to expectation, fast neutron reactions of the types cited should lead to confusion of the results, it is within the province of this invention to surround the fast neutron source with a thickness of hydrogenous material which will substantially reduce the neutrons to thermal energies before they enter the formation. With these thoughts in mind, interference of neutron-proton and neutron-alpha reactions will be disregarded in the remainder of this discussion.

In measuring gamma radiation simultaneously with bombardment, as in the neutron log, the residual gamma radiation is obscured by the overwhelming quantity of gamma rays formed in inelastic collisions and as reaction products in the neutron-gamma reactions. However, by measuring the gamma radiation after removal of the neutron source, the residual gamma radiation may be determined as the difference between the gross gamma activity and the known gamma-ray background. It is further necessary to determine what fraction of the residual gamma radiation is derived from radioactive chlorine$^{38}$, the indicator isotope in the present invention.

Among the constituents of an oil or water sand which contribute to the residual gamma radiation, only sodium, aluminum, magnesium, manganese, chlorine, iron and calcium are present in sufficient quantity to be of any possible importance. Of these, calcium and iron may be disregarded because of the small cross-sections, or specific reaction probabilities, exhibited by isotopes of these elements in respect to the neutron-gamma reaction. Accordingly, the residual gamma radiation may be ascribed to the isotopes, sodium[24], aluminum[28], magnesium[27], manganese[56], and chlorine[38], these being derived from the stable target isotopes sodium[23], magnesium[26], etc.

The relative rates of formation each to the other of the radioactive isotopes formed during neutron bombardment depend upon numerous factors, including the percentages of the target elements in the formation and the isotopic abundances, isotopic weights and cross-sections for the neutron-gamma reaction of the target isotopes. The relative rates of gamma ray emission of the radio-active isotopes depend upon the relative rates of formation and, in addition, upon the total time of bombardment, the time elapsed after cessation of the bombardment and the disintegration constants of the isotopes. It will be noted that the intensity of the bombardment does not affect these relative rates, however, it directly affects the absolute magnitudes of the rates and obviously must be sufficiently high to prevent the residual gamma radiation from being obscured by the natural background. The relative rate values herein considered have no absolute significance as individual quantities; only the ratios of the values for different isotopes are important.

The above description of relative rates of formation of gamma-emitting isotopes and relative rates of gamma emission therefrom may be more clearly understood by an illustrative calculation for a representative California sandstone composition. A sandstone analyzing in the dry state, 2.49% sodium, 0.03% manganese, 0.75% magnesium and 6.68% aluminum together with silica, etc., is to be considered. Assuming a porosity of 30% and saturation with brine containing 15,000 parts per million of chlorine, the chlorine content of the formation, on a basis comparable with the above percentages, is expressed by the number, 0.238. It should be pointed out that none of the information available indicates the presence of any chlorine in oil-bearing mineral structures themselves. The isotopic abundance of sodium[23] and of manganese[55] and of aluminum[27] is 100%, that of magnesium[26] is 11.1% and that of chlorine[37] is 24.6%. Chlorine[35] may be disregarded for this purpose because of its low cross section for the neutron-gamma reaction and the very slow disintegration rate of radioactive chlorine[36]. The cross sections for neutron-gamma reactions employed in this calculation should be rigorously weighted mean values, since the cross section of a target isotope varies with the neutron energy and the neutron flux employed in this invention covers a wide range of energy values. However, since the complete data for such a calculation do not exist and thermal energy is the most important single energy level, cross section for slow neutron capture will be employed. These, expressed in Barns, are approximately as follows:

| Isotope | Cross Section |
| --- | --- |
| Sodium[24] | 0.4 |
| Manganese[56] | 9.4 |
| Magnesium[26] | .03 |
| Aluminum[27] | .2 |
| Chlorine[37] | .6 |

The relative rates of formation of each radio-active isotope may now be computed by multiplying the elemental percentage, isotopic abundance and cross section and dividing by the isotopic weight of the target isotope. The results are tabulated below:

| Isotope | Relative Rate of Formation (K) |
| --- | --- |
| Sodium[24] | .043 |
| Manganese[56] | .0051 |
| Magnesium[27] | .000096 |
| Aluminum[28] | .042 |
| Chlorine[38] | .00095 |

The disintegration constant, lambda, is defined as the fraction of the total number of a species of nuclei present at a given instant which will have disintegrated after unit time, and is related to the more familiar half life, or $T_h$, by the equation:

$$\lambda = 0.693/T_h \qquad (3)$$

Using one minute as the unit of time, disintegration constants for the five radioactive isotopes are as follows:

| Isotope | Disintegration Constant ($\lambda$) |
| --- | --- |
| Sodium[24] | .00078 |
| Manganese[56] | .0046 |
| Magnesium[27] | .068 |
| Aluminum[28] | .29 |
| Chlorine[38] | .019 |

The relative rates of gamma-ray emission, or relative activities, at the conclusion of the bombardment may be calculated by the equation:

$$\text{Activity} = K(1 - e^{\lambda t}) \qquad (4)$$

where K equals the relative rate of formation and $t$ equals the time of bombardment. Taking $t$ as 30 minutes, a simplified form of the equation is as follows:

$$\text{Activity} = K(1 - 10^{-13.04\lambda}) \qquad (5)$$

On the above basis, the activities of the isotopes at the end of a thirty minute bombardment period are calculated to be in the following ratios:

| Isotope | Relative Activity |
| --- | --- |
| Sodium[24] | 2.44 |
| Manganese[56] | 1.56 |
| Magnesium[27] | 0.20 |
| Aluminum[28] | 103.0 |
| Chlorine[38] | 1.00 |

If the log of the activity of a single isotopic species is plotted against time a straight line is obtained, in keeping with the equation:

$$\log \frac{A_1}{A_2} = \lambda(t_2 - t_1) \qquad (6)$$

where A represents activity and t represents time. Thus, referring to the California sandstone example, the relative activities of the five isotopes considered can be determined for any time after cessation of the bombardment for each isotope by setting $A_1$ equal to the previously listed relative activity at the end of the bombardment, setting $t_1$ equal to zero and solving for $A_2$ at any chosen value of $t_2$. The ratios of the five activities will vary radically as a function of time. This is evident from the differences in half-lives of the five isotopes which are listed with the decay equations given below:

$$Na^{24} \xrightarrow[888 \text{ min.}]{\beta^-, \gamma} Mg^{24} \qquad (7)$$

$$Mg^{27} \xrightarrow[10.2 \text{ min.}]{\beta^-, \gamma} Al^{27} \qquad (8)$$

$$Cl^{38} \xrightarrow[37 \text{ min.}]{\beta^-, \gamma} Ar^{38} \qquad (9)$$

$$Mn^{56} \xrightarrow[156 \text{ min.}]{\beta^-, \gamma} Fe^{56} \qquad (10)$$

$$Al^{28} \xrightarrow[2.4 \text{ min.}]{\beta^-, \gamma} Si^{28} \qquad (11)$$

In the use of the chlorine log, the chlorine content of the formation could be most conveniently computed in terms of the chlorine activity immediately after cessation of the neutron bombardment. Inspection of the above-listed relative activities indicates that a measurement of the gross gamma activity at this time would not be an indication of the chlorine activity because of the interference of other isotopes. However, from measurement of the gross activity taken at successive intervals after the bombardment a gross decay curve can be plotted. This curve can then, by the familiar "peeling off" method be broken down into component straight-line curves, of the properties described in the previous paragraph. The intercept of the chlorine $^{38}$ line with the axis of zero time gives the desired value for chlorine activity at the end of the bombardment.

The chlorine activity discussed above is, of course, a measured, or "effective," chlorine activity. Only a small part of the total gamma activity of the five synthetic isotopes here considered is registered by the counter owing to the geometric factor, which is almost the same for each of the five isotopes, and the counting efficiency factor, which is different for each isotope as well as for the activities causing the natural background. The geometric factor is related to the average solid angle offered by the counting chamber to the isotopes synthesized in the formation; the counting efficiency with respect to a given radioactive isotope is a function of the gamma-ray energy, or energies, involved, and is determined by the probability that a gamma-ray aimed at the counter will either be absorbed before reaching the counting chamber or will pass through the chamber without being registered. In the present illustrative calculations, the ratios of the measured activities are presumed to be the same as the calculated ratios of the activities induced in the formation. Due to differences in counting efficiencies this will not be strictly true in practice.

During the first few minutes after the bombardment the radiation will predominantly consist of magnesium and aluminum activities, hence in the operation of the chlorine log a gamma-ray measurement is not made until sufficient time has elapsed for these short-lived activities to decay to negligible proportions. Thus, the first measurement of the gross gamma radiation is made after, say, 60 to 90 minutes and at this time the radiation is derived almost exclusively from chlorine, manganese, sodium and the natural background. Periodic measurements of the gross gamma activity are then taken over a time sufficient for the chlorine activity to decay to negligible proportions in comparison with the sum of the manganese, sodium and background activities. This situation will be attained in three to eight hours after cessation of the bombardment, the exact time depending on the relative amounts of the several elements in the formation, the intensity of the neutron bombardment, the magnitude of the background and other factors. Thereafter readings are taken over an additional one or two hours. The log of the activity is then plotted against time to give a decay curve for the gross activity, as previously described. The natural gamma-ray background, obtained in the preliminary gamma-ray log is then subtracted yielding a net curve for the gross residual gamma radiation. The gross activity measured during the last one or two hours of intermittent measurements can be regarded as deriving exclusively from sodium$^{24}$ and manganese$^{56}$, and knowing the slopes of the decay curves for these isotopes, this portion of the gross residual activity curve can readily be resolved into two straight line components. By extrapolation of these decay lines to zero time and subtraction from the curve for gross residual radiation a net straight-line curve representing chlorine$^{38}$ will be obtained. This line, extending on the time ordinate from 60 to 90 minutes to 3 to 8 hours can then be extrapolated to zero time and the chlorine activity at the end of the neutron bombardment determined.

The practice outlined above of joint resolution of sodium$^{24}$ and manganese$^{56}$, the two longest-lived components of the complex decay curve, is employed in order to save time. If desired the decay curve can be plotted for a number of additional hours until manganese$^{56}$ has decayed to negligible proportions and the two components then resolved consecutively, as is the general practice.

Values for the chlorine activity at various depths in a formation may be used to compute absolute values of water saturation or may be used in a relative sense to indicate changes in saturation at different depths in a sand stratum as with the electric log. In either case the assumptions must be made that (1) a direct relationship exists between the measured chlorine activity and the chloride content per unit volume of formation, (2) the chloride content of the formation is the same throughout the formation and (3) the average porosity is the same at all test intervals. In the case where exact water saturations are to be determined it is further necessary (1) to calibrate by determining the chlorine activity at the end of the neutron bombardment for a formation of known chloride content and (2) to know the chloride content of the formation water in advance. The assumption of uniform porosity over a test interval may be somewhat questionable but appropriate corrections can, if necessary, be made on the basis of the neutron log which indicates porosity. Basic to the entire invention is the fact that the chlorine content of the formation is contained, almost exclusively, in the formation water.

The length of the bombardment period is selected with the objective of inducing a high absolute level of isotopic activity of the element to be detected while avoiding an unduly high ratio of activity of the other elements to the selected element. In this regard, it is necessary to remember that throughout the course of the bombardment decay of active isotopes formed in prior stages of the bombardment is taking place. The optimum time of bombardment is selected on the basis of Equation 4, by means of which it can be shown that after a bombardment time equal to the half-life of a given isotope 50% of the maximum possible activity is attained, whereas, the 100% level can be reached only after infinite time. Thus, in the system presently considered, if the bombardment time is only a few minutes the short-lived aluminum and magnesium activities will be formed in high percentages of their theoretical maximum, whereas, the intermediate-level chlorine activity will be only slightly developed; on the other hand, if the bombardment is extended beyond about 40 minutes, a moderate gain in chlorine activity will be accompanied by an intolerably large increase in sodium and manganese activity. Thus, the optimum bombardment time with these elements present in the rock for the detection of chlorine is in the range of about 20 to 40 minutes.

It should be noted that a great many sandstones are free of sodium and thus it may be more practical in such a case to determine the water content of the formation by the radioactive detection of the sodium rather than the chlorine. Such procedure has a possible advantage of greater accuracy because of sodium's high relative activity and its comparatively long half life. In such a case the bombardment may be of considerably longer duration for the isotopic activity of the sodium will continue to increase beyond the point at which all of the other isotopes are approaching their absolute level of activity at a comparatively slow rate. Thus in the case of sodium free sandstone it may be desirable to carry out the bombardment for a period in excess of 40 minutes and possibly for as long as four or five hours and subsequently allow the lapse of a period of time sufficient to permit the decay of the shorter lived isotopes to negligible proportions. In five to eight hours after the bombardment the gross activity curve obtained by counting the gamma rays will be composed only of the natural gamma ray background and the decay of the manganese and sodium isotopes. The decay of the other active isotopes formed in the bombardment will be substantially complete and any gamma rays originating therefrom will be negligible and may be ignored. In a period of ten to twelve hours after the bombardment the active sodium isotope wil be approaching its half life and the manganese will have decayed to approximately 10% of its original activity. At this point a very few points on the gross curve determined by periodic counts of the gamma rays will permit extrapolation back to the original sodium content.

Alternatively the chlorine log may be carried out as above described and thereby subsequently determine both the chlorine and sodium contents of the formation. The sodium content must be determined in any case as a step in the determination of the chlorine content, but if the sandstone in question is free of sodium the entire amount will be present in the salt water and the chlorine and sodium determinations may be utilized as checks on each other. It naturally follows that if the formation minerals do contain sodium the determination of the amount present will be of no value in ascertaining the presence of salt water except as an integral part of the ultimate determination of the chlorine content.

Although my invention has been described with particular emphasis on the determination of the presence of salt water in liquid containing sands by measurement of chlorine or sodium content thereof the invention has other applications which may be of considerable value, in many cases. Thus it has been shown how the relative chlorine content of the strata may be obtained by utilization of the differences in decay rates of the radioactive isotopes of chlorine, sodium and manganese after the substantially complete decay of the radioactive isotopes of aluminum and magnesium.

It is well known that shales in general contain considerably more aluminum oxides than do the sandstones. Twelve samples of shale analyzed contained an average of approximately 15% of aluminum oxide, while the average aluminum oxide content of 253 sandstones reported by Clarke in The Data of Geochemistry was approximately 4.8%. The magnesium oxide contents of both shale and sandstone is substantially equivalent ranging from approximately 1% to 2%. Thus, if gamma-ray measurements are taken throughout the first three or four minutes after termination of the bombardment the rapid drop in the gross decay curve will be due substantially to the aluminum and magnesium isotopic decay. By comparison of the proportionate magnitude of this initial rapid decay it is possible to distinguish between shale and sandstone by calculation of the aluminum content thereof. The ability to accomplish this distinction between shale and sandstone is of particular importance in authenticating the results of an electric log or gamma ray log. It frequently happens that an electric log and a gamma ray log will not agree in their location of these strata in which case the logging method of the present invention will make it possible to ascertain which, if either, is correct.

Here again the length of bombardment is important and may be advantageously varied to magnify the proportion of the gross gamma-ray radiation originating from the isotopic decay of the primary element concerning which information is sought. The active isotope of aluminum having a half life of approximately 2.2 minutes decays more rapidly than any of the other isotopes under consideration. By the same token the maximum level of isotopic intensity is attained in a much shorter period of bombardment. Thus, in a bombardment of from two to three minutes the active aluminum isotope is present in an amount of approximately 50% to 60% whereas the magnesium isotope will be present to the extent of only about 20% or less of maximum and the active isotopes of chlorine, sodium and manganese will be present in only negligible amounts. Therefore, in a bombardment of from about two to three minutes followed by periodic counts of the gamma radiation over a time interval of one to ten minutes the present aluminum may be quickly and accurately determined.

Further, because of the exceedingly rapid decay of the aluminum isotope, the aluminum content of the formation may be determined as an auxiliary step of a chlorine or sodium log. By making a few gamma ray counts directly after the bombardment whether it be a half hour bombardment for a chlorine log or a longer one for a sodium log, the rapid decay of the aluminum isotope present is readily detected. By a continuation of the same process of extrapolation as employed to determine the chlorine content the aluminum content can also be determined.

In effect therefore I have discovered a means of analyzing any given zone of a subsurface formation for aluminum, magnesium, chlorine, manganese and sodium content, from which data the presence of sand or shale and the presence of water or oil can be determined. The detection of oil by the method of my invention is formulated on the basis of previous determination of the presence of liquid from which the ability to detect the presence of salt water makes possible the isolation of the oil containing zones.

The measurement of residual gamma activity in one sand section and the bombardment of another may be carried out simultaneously in a well, provided that sufficient separation between the counting instrument and the bombarding source is provided, and, in the case of dry-hole logging, a lead shield several inches thick and of greater diameter than the counter is attached at the end of the counter nearest the neutron source. Thus, if we assume a 100-foot sand structure containing either oil or water as determined by the neutron log, a neutron source is lowered according to one embodiment of my invention to the bottom level of this information. I have found that a neutron source of about three feet in length is convenient, and will generally give sufficient accuracy although this length may be varied over comparatively wide limits to fit special circumstances. Using such a neutron source the lower three feet of the sandstone or limestone strata will be bombarded for half an hour in the case of the chlorine log whereupon the neutron source may be raised in increments of three feet or if desired in larger increments, and bombarding, successive sand sections, each for a period of half an hour. After the first three-foot section has been allowed to decay for approximately 90 minutes, the counting instrument, previously in the hole and below the neutron source but not in use, may be placed in position opposite said section and a count taken for that section. In this manner the counting instrument will always be nine or more feet removed from the neutron source when in use and may be raised and lowered to measure the gamma radiation opposite various bombarded sections alternately and intermittently. Since in each sand section bombarded the activity must be followed for a period that may be as much as eight hours, starting about 90 minutes after the end of the bombardment, and a new sand section is bombarded every half hour, the counting instrument may be required to follow the gamma activity in as many as 16 sand sections at a time, unless the total number of sand sections consecutively bombarded is less than this number. Assuming that at least one measurement per hour must be made opposite each sand section, this limits the time of each individual count to about three minutes. If fewer than 16 sand sections are bombarded the counting period can be proportionately longer. The time required for a chlorine log of a 100-foot sand will be from 24 to 28 hours if a bombardment is made every three feet but only from 16 to 20 hours if the bombardments are spaced at six foot intervals.

It may be found in the future that because of the rapidity with which the natural gamma-ray log is taken the values obtained will not be accurate enough for use as background corrections in the chlorine log calculations. In this event it may be desirable, an hour or more after the neutron log is taken and before the chlorine log neutron bombardment, to recount the gamma ray background at every position to be subsequently bombarded, using the same counting instrument and time of counting to be used in the subsequent chlorine log operations. This additional gamma-ray log may or may not be necessary, but it is intended that the present invention include the usage of this extra log.

The potential accuracy of the chlorine log procedure will be considerably greater in some strata than in others owing to the wide variation of lithologic properties affecting the performances of the log. However, unfavorable situations can to a very great degree be compensated for by adjustment of factors in the logging procedure subject to human control. In the chlorine log procedure chlorine activity is, essentially, determined as the difference between the gross activity and the sum of the manganese and sodium activities and the natural gamma-ray background. Obviously if the error involved in the radiation measurements is of the same order as the differential quantity to be computed, accurate determination of the latter will be impossible. If a precarious situation of this type should arise because of an inordinately high natural background an obvious recourse is to increase the absolute level of the induced activity by increasing the intensity of the neutron bombardment. Accordingly, because of the wide variations in the natural backgrounds of sands and limestones a flexible range of from 50 to 5000 curies has been specified for the neutron source. Another recourse is to reduce the length of the neutron source and the counting chamber without reducing the intensity of the neutron flux. This should reduce the magnitude of the measured background without greatly affecting the measured residual gamma radiation. If in a formation an exceptionally high content of manganese and sodium relative to chlorine should pose a critical situation, little could be done about it. However, it should be pointed out that the California sandstone composition hereinbefore used to illustrate the calculations was about as unfavorable as is likely to be encountered and yet is not prohibitive. Thus, the California sandstone contained 2.49% of sodium and 0.03% of manganese, whereas in "The Data of Geochemistry," fifth edition, by Frank Wigglesworth Clark, a composite analysis of 253 sandstones of deverse origins given on page 547 lists only 0.34% of sodium and only a trace of manganese. It would appear that California sandstones are less well adapted than formations in other areas to the utilization of the radioactive chlorine log of the present invention. Another source of error is the well known statistical error which is inherent in the probability nature of radioactive disintegration processes. This introduces an uncertainty in a measurement of a disintegration rate which is proportional to the total number of individual disintegrations affecting the counter during a measurement. This error can be reduced by use of a long counting period and a counter designed to respond to a high percentage of the incident gamma rays.

Having described and illustrated my invention with emphasis on the methods of application thereof to further the art of petroleum production practices, and with the realization that many modifications both with respect to apparatus and utilization will occur to those skilled in the art without departing from the spirit or scope of the invention, I claim:

1. A method of determining the characteristics of a well bore which comprises initially measuring the natural gamma-ray intensities of various strata of the well bore, subsequently bombarding said strata of said well bore with fast neutrons followed by a simultaneous measurement of the secondary gamma rays returning from said strata and lastly subjecting said strata to bombardment with neutrons, allowing at least one hour after said bombardment for the decay of the prevailing gamma-ray flux and thereafter measuring the gamma rays originating in the radioactive isotopes synthesized during said last named bombardment.

2. A method according to claim 1 wherein the alpha ray source employed for the purpose of accomplishing said second bombardment is in the order of magnitude from about 50 to about 5000 curies.

3. A method according to claim 1 wherein the alpha ray source employed for the purpose of accomplishing said second bombardment is in the order of magnitude from about 100 to about 1000 curies.

4. A method according to claim 1 wherein the neutrons employed to bombard said strata are obtained by the nuclear reaction between energetic alpha particles and elements of the class of beryllium and boron, said alpha particles originating in polonium$^{210}$.

5. A method of locating the presence of oil in subsurface strata known to contain liquid which comprises bombarding said strata with neutrons, and at least an hour after said bombardment periodically measuring the gamma rays originating in the radioactive isotopes synthesized during said bombardment.

6. A method of locating the presence of oil in subsurface strata known to contain liquid which comprises distinguishing between oil and salt water by a series of steps consisting of initially measuring the natural gamma-ray intensities of said strata of the well bore, subsequently bombarding said strata with fast neutrons from a source utilizing an alpha-emitter of less than about 50 curies and simultaneously measuring the secondary gamma rays returning from said strata, and lastly bombarding said strata with a high flux of neutrons, and at least an hour after said bombardment periodically measuring the gamma rays originating in the radioactive isotopes synthesized during said bombardment.

7. A method according to claim 6 wherein the alpha ray source employed for the purpose of accomplishing said high flux neutron bombardment is in the order of magnitude of from about 50 to about 5000 curies.

8. A method according to claim 6 wherein the alpha ray source employed for the purpose of accomplishing said high flux neutron bombardment is in the order of magnitude of from about 100 to about 1000 curies.

9. A method of locating the presence of oil in subsurface strata known to contain liquid which comprises bombarding said strata with a flux of neutrons of the order of about $5 \times 10^8$ to $5 \times 10^{10}$ neutrons per second for a period of about thirty minutes, allowing from about 60 to about 90 minutes' time after said bombardment for the decay of the prevailing gamma-ray flux, and thereafter measuring at frequent intervals over a period of from about three to about eight hours the gamma rays originating in the radioactive isotopes synthesized during said bombardment.

10. A method of locating the presence of oil in subsurface strata known to contain liquid which comprises measuring the natural gamma ray intensities of said strata, thereafter bombarding said strata of said well bore with fast neutrons of low intensity while simultaneously measuring the secondary gamma rays returning from said strata and subsequently subjecting said strata to bombardment with a flux of neutrons of the order of magnitude of about $5 \times 10^8$ to $5 \times 10^{10}$ neutrons per second for a period of about 30 minutes, allowing from about 60 to about 90 minutes' time after said bombardment for the decay of the prevailing gamma-ray flux, and thereafter measuring at frequent intervals over a period of from about three to about eight hours the gamma rays originating in the radioactive isotopes synthesized during said bombardment.

11. A method of analyzing subsurface formations for the elements aluminum, chlorine, magnesium, sodium and manganese which comprises bombarding said formation with a neutron flux of from about $5 \times 10^8$ to $5 \times 10^{10}$ neutrons per second for a period of time ranging from a few minutes to several hours, and thereafter making a plurality of counts of the gamma rays originating from the active isotopes of said elements formed during the said bombarding throughout a period ranging from a few minutes to several hours.

12. A method of determining brine containing sodium chloride in a subsurface stratum containing liquids which comprises measuring the natural gamma ray intensity of said stratum, bombarding said stratum with neutrons while simultaneously measuring the secondary gamma rays returned from said stratum, subsequently bombarding said stratum with a flux of neutrons greater than about $5 \times 10^8$ neutrons per second for a period greater than about 20 minutes, and at least one hour thereafter making periodical measurements of the gamma radiation from the radioactive isotopes synthesized during the neutron bombardment.

13. A method according to claim 12 in which the second neutron bombardment is carried out for a period between about 20 and 40 minutes, and the subsequent gamma radiation is measured periodically over a period between about 3 and 8 hours thereafter to determine the chlorine$^{38}$ content of the brine.

14. A method according to claim 12 in which the subsurface stratum is a sodium-free sandstone, the second neutron bombardment is continued for a period of between about 40 minutes and 5 hours, and the subsequent gamma radiation is measured over a period between about 5 and 12 hours thereafter to determine the sodium content of the brine.

FREDERIC W. ALBAUGH.

REFERENCES CITED

The following references are of record in the file of this patent:

UNITED STATES PATENTS

| Number | Name | Date |
| --- | --- | --- |
| 2,220,509 | Brons | Nov. 5, 1940 |
| 2,275,748 | Fearon | Mar. 10, 1942 |
| 2,303,688 | Fearon | Dec. 1, 1942 |